INVENTORS
THOMAS G. HAGAN
F. MANSFIELD YOUNG
BY Kenway, Jenney,
Witter & Hildreth
ATTORNEYS United States Patent Office 3,076,956
Patented Feb. 5, 1963

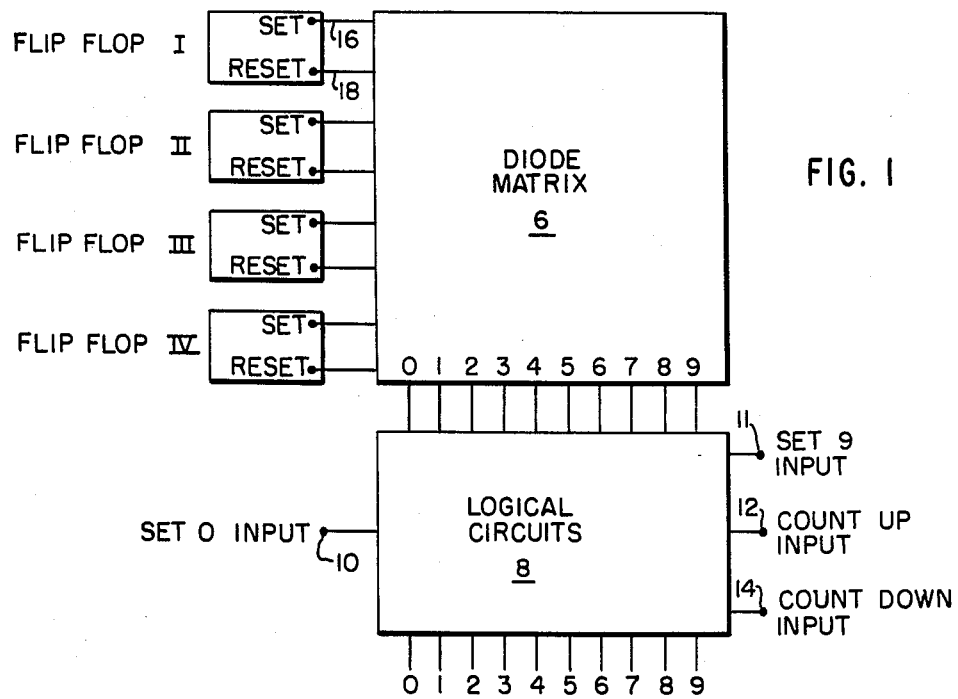

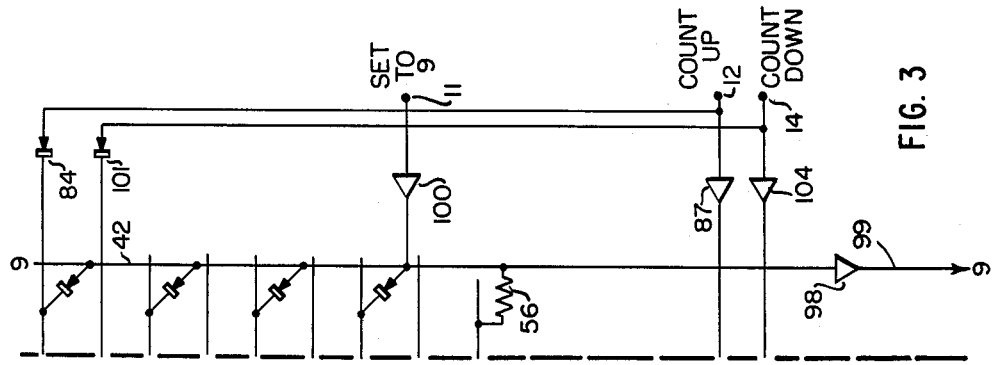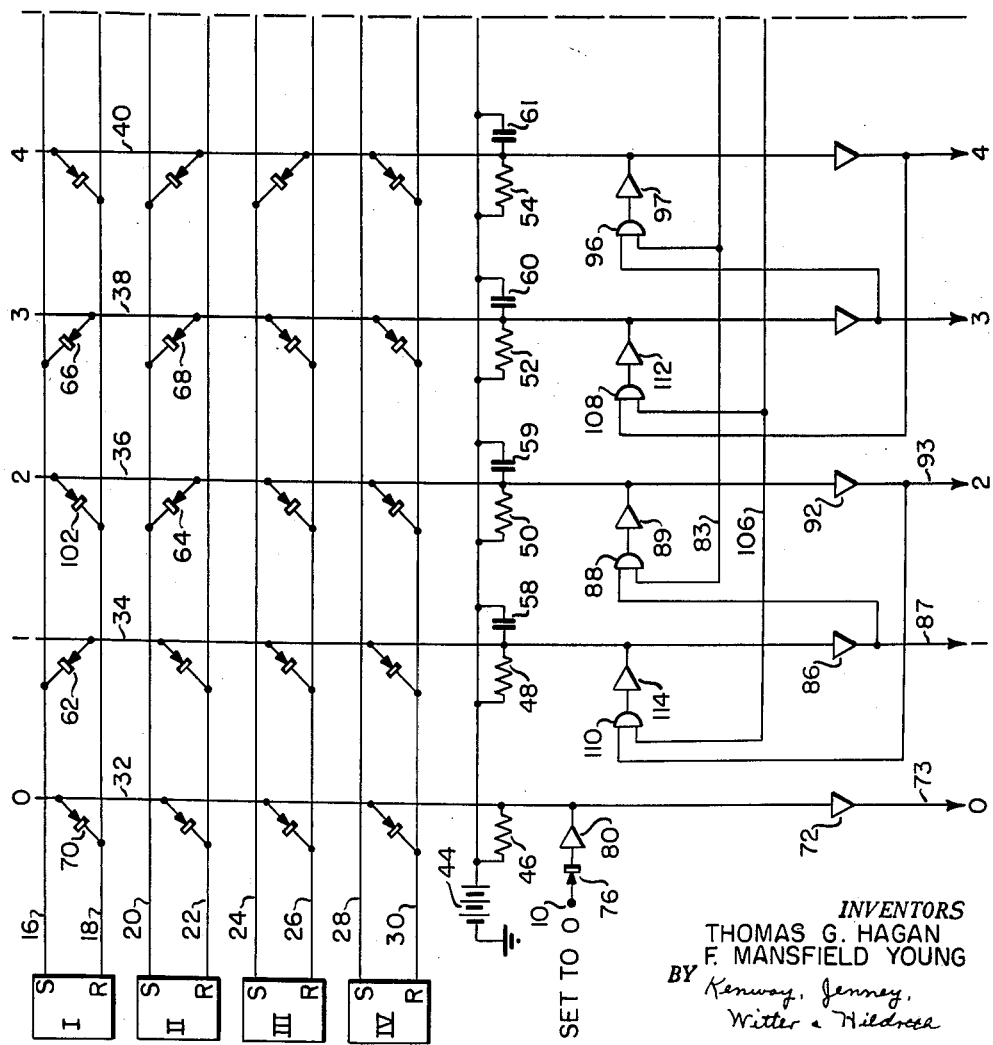

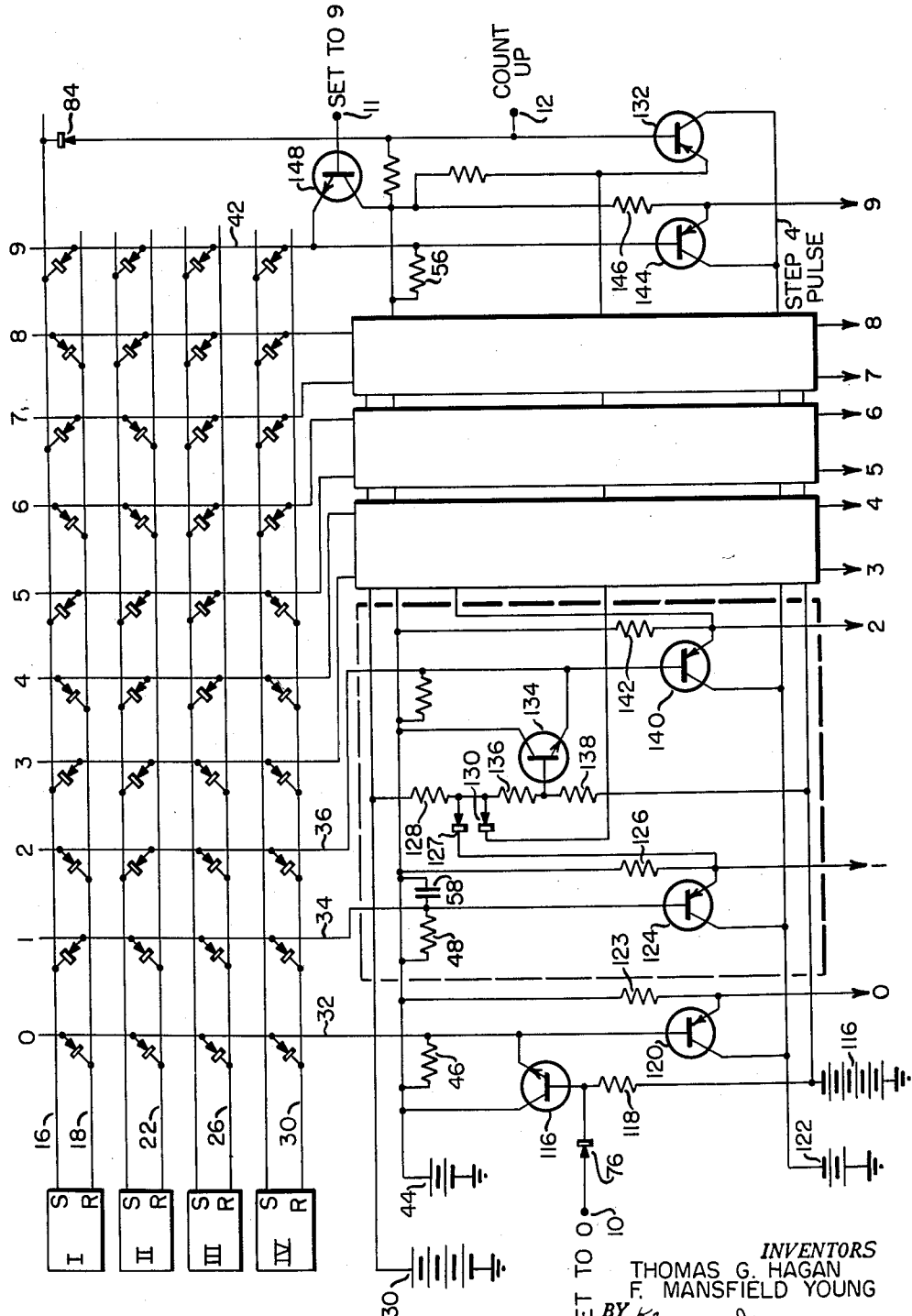

3,076,956
REVERSIBLE COUNTER
Thomas G. Hagan, Brookline, and Frink Mansfield Young, Boston, Mass., assignors to Adage, Inc., Cambridge, Mass., a corporation of Massachusetts
Filed Aug. 6, 1959, Ser. No. 832,038
10 Claims. (Cl. 340—172.5)

Our invention relates to an improved electronic digital counter. More particularly, it relates to an improved high speed pulse counter of substantially greater simplicity of construction and convenience of use than pulse counters heretofore available.

In present day digital computers and like devices, it is often desirable to count the number of pulses of electrical energy appearing on a lead and, to this end, electronic pulse counters have been devised. In general, such counters utilize a plurality of bistable circuits which are known as "flip-flops" or "triggers." These circuits are usually composed of two elements such as two vacuum tubes or two transistors so connected that when one transistor or vacuum tube is conducting it develops a signal which shuts the other transistor or vacuum tube off. Two output terminals are generally provided from such devices and each terminal can have two states, a state where the vacuum tube or transistor with which the terminal is associated is conducting and another state when the device is nonconducting. When one of the terminals is in the conducting state for example, the other terminal is in the nonconducting state. Two input terminals are provided to the flip-flops, and when pulses are applied to these input terminals, they cause the device to change state. For example, if the vacuum tubes or transistors in the circuit are referred to as "A" and "B," when the "A" device is conducting and the "B" device is non-conducting, a pulse of the proper polarity applied to the "B" device will cause it to begin conducting and to shut the "A" device off, thus reversing the state of the flip-flop.

Since devices of this sort have two stable states accordingly they are referred to as bistable elements. The term flip-flop as used herein is intended to refer to all types of bistable elements including electronic bistable elements of the type described as well as relays or other devices capable of assuming two different states.

Electrical or electronic counters heretofore constructed have in general used a plurality of electronic flip-flops to store the number being counted. Thus, before beginning a count all the flip-flops may be set to a first state which will be termed herein the reset state. The first pulse to be counted causes a first flip-flop to change from the reset to the opposite state which will be termed herein the "set" state. This indicates that a single pulse has appeared on the input lead to the counter and an indicator connected to the flip-flops may be set to indicate this condition. The next pulse to be counted which appears may be connected through logical circuitry associated with the flip-flops to cause the first flip-flop to change to the reset state and to set a second flip-flop. The third pulse may again set the first counter to the set state and the fourth pulse, again through logical circuitry associated with the flip-flops, may cause the first two flip-flops to assume the reset state and cause a third flip-flop in the back of flip-flops to assume the set state. It will be observed that the number of input pulses is stored in the flip-flops in binary fashion. In general $n$ flip-flops will permit counting $2^n$ pulses by the counter of which the $n$ flip-flops are a part.

Decimal counters are of particular interest; most people are familiar with the decimal system and accordingly it is desirable to provide output units with a decimal display. Decimal counters in general require four flip-flops. The four flip-flops can provide sixteen different combinations, although only ten of these are required for decimal counting. Three flip-flops will provide only eight combinations, which is not sufficient for decimal counting. A typical decimal counter of the type heretofore used and similar to that described above is illustrated and described at pages 15–56 and 15–57 of Hunter, Handbook of Semiconductor Electronics, McGraw-Hill Book Company, Inc. (1956).

As has been explained, in the counters heretofore used, logical circuitry must be provided which is associated with with flip-flops to assure that the proper flip-flops are turned on and off at the correct times so that the states of the various flip-flops correctly represent the number of pulses which have been applied to the counter.

In many cases, it is also desirable to provide a selected output from the counter. For this purpose, a diode matrix is usually connected to the flip-flop output terminals. The busses forming one set of matrix conductors are connected to the flip-flop output leads and the busses to be selected form a second set of conductors. In a decimal counter for example it may be desirable to select one out of ten leads in this second set. To accomplish this, the "digit" conductors, which means those conductors forming the second set, are connected to the flip-flop busses by diodes, the actual interconnections depending upon the binary to decimal code according to which the flip-flops are energized by the logical circuits associated therewith. By the use of a matrix of this type, one of a number of output leads may be selected or energized according to the total count which has been supplied to the counter. If for example an indicator is connected to each of the output leads from the diode matrix, a visual indication of the count in the counter may be provided.

While counters of this type have been satisfactory in their operation, several problems associated with them have become apparent in certain applications. One of the more important of these problems is that of changing the binary to output code according to which the conductors in the second set are energized. For example, if the counter is a decimal one, the number 8 in the counter might be represented by the flip-flop settings 1000, where a 1 represents a flip-flop in the set state and a 0 represents a flip-flop in the reset state. In this case, three of the four flip-flops would be in the reset state while one would be in the set state. However, for some uses it may be desirable to change the coding and represent the 8 in the counter by a flip-flop setting such as 1110. The actual binary to output code desired depends upon a number of factors, including the equipment with which the counter is to be used. Heretofore the coding between the flip-flops and the output units could be changed by changing the diode matrix, but this also involves a substantial rearrangement of the logical circuitry associated with the flip-flops. Because of this inconvenience each counter has in general been tailored for its specific application and a generalized counter has not been developed.

Another problem with the pulse counters heretofore used was that circuitry to enable the counters to count in both directions were extremely complex. To count in both directions two inputs are provided; pulses applied to one input will cause the counter to count upward, e.g. 0, 1, 2, 3 etc., while pulses applied to the other input will cause the counter to count down, e.g., 4, 3, 2, 1, 0. There are many applications where it is desirable to measure the difference in the number of pulses appearing on two leads, and a simple and therefore reliable counter to meet this need has also not heretofore been available.

Still another problem associated with counters of the type heretofore developed was that in general they required a substantial amount of associated logical circuitry, especially when one out of a plurality of leads was to be selected.

When it was desired to change the count in the counter from one number to another, the change requiring a change in state of a number of the storage flip-flops, it was necessary to wait after each pulse in the pulse train was supplied for the flip-flop to change state and the logical circuitry to arrange the next input path. This resulted in a counter having a very definite speed limitation.

In general, we have found that substantially improved electronic pulse counters for counting a sequence of pulses on an input lead may be made by changing the location of the logical circuits from association with the flip-flops to association with the output leads of a diode matrix the other set of matrix conductors being connected to the flip-flop terminal. In counters made according to our invention, a plurality of flip-flops are provided as in the counters heretofore used. These counters are interconnected with the logical circuits through a diode matrix, the output leads from the counter leading from the logical circuits. Input pulses are fed to the logical circuits, and all logical operations are performed at the output terminals of the matrix. As will be apparent from the construction hereinafter described, this circuitry provides a substantial simplification over the circuitry heretofore used when a selected output lead is desired. Further, by associating the logical circuits with the output side of the diode matrix rather than with the flip-flops, changes in the binary to output code may be made merely by changing the locations of the diodes in the matrix, and no change in the logical circuit elements is required. This permits the counter to be adapted to a wide range of usage.

The flip-flops in counters made according to our invention are all set simultaneously for a particular count by energization of a particular input lead. Thus there is no variation in the speed of the counter in going from one count to another, each count requiring the same time. Further, this time is short compared to prior counters, and the result is a relatively high speed device. Finally, the extreme simplicity of the circuitry associated with the improved counters made according to our invention permits an extremely simple design for a reversible counter.

Accordingly, it is a principal object of our invention to provide an improved electronic pulse counter. Another object of our invention is to provide a counter of the type described in which the logical circuits are associated with the output leads from the diode matrix rather than being associated with the flip-flops which are used as storage elements. Still another object of our invention is to provide a counter of the type described which is capable of selecting one out of a plurality of output leads with a substantial simplification of the logical circuitry required for this selection. A still further object of our invention is to provide a counter of the type described of simple design and capable of both forward and reverse counting i.e. a reversible counter. A still further object of our invention is to provide a high speed counter capable of "fast carry" i.e. capable of high speed transition from one state to the adjoining state. A still further object of our invention is to provide a counter in which the binary to output coding may be readily changed without requiring any change in the logical circuitry associated with the counter. These and other objects of our invention will in part be obvious and will in part appear hereinafter.

Our invention accordingly comprises the features of construction, combinations of elements, and arrangements of parts will be exemplified in the constructions hereinafter set forth, and the scope of the invention will be indicated in the claims.

For a fuller understanding of the nature and objects of the invention, reference should be had to the following detailed description taken in connection with the accompanying drawings in which:

FIG. 1 is a generalized block diagram of the improved counter made according to our invention;

FIG. 2 is a table showing the setting of the flip-flops of the counter illustrated for each of the ten outputs;

FIG. 3 is a block and line diagram showing a specific reversible counter made according to our invention;

FIG. 4 is a schematic circuit diagram of the counter illustrated in FIG. 3 for "counting up" operation only.

Figure 5:
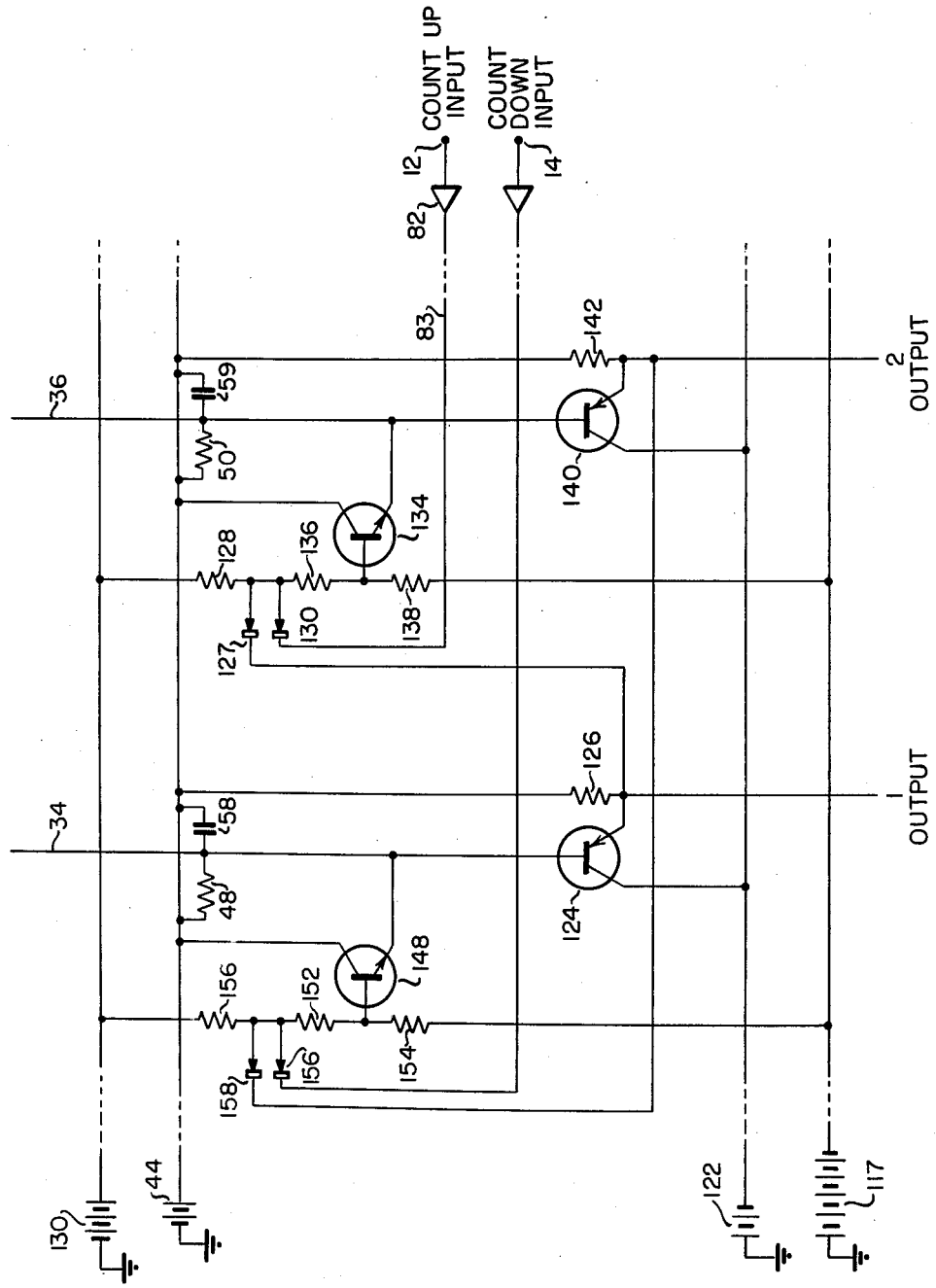
FIG. 5 is a schematic diagram illustrating one embodiment of circuitry for both count up and count down operation for the counter of FIG. 4.

The improved counter made according to our invention is illustrated in the drawings as being a decimal counter, i.e., ten outputs are provided and as pulses are fed to the "count up" input of the counter, it steps from "0" to "1" to "2" etc. up to "9," the maximum value of the particular counter shown. Pulses fed to the "count down" input cause the counter to count in the opposite direction. It is to be understood of course that other and different counters based on any numbering system may be provided which may utilize our invention and the construction of such counters will be obvious from the description given herein.

As shown in FIG. 1, the counter comprises a bank of flip-flops, labeled respectively flip-flops I, II, III and IV which are connected to a diode matrix 6. Ten leads lead from the diode matrix to the logical circuits 8 and ten output leads are provided from the logical circuits the leads being labeled according to the count on which they are selected. A "Set 0" input terminal 10 is provided and a pulse applied thereto sets the counter to the "0" state no matter what the counter setting when this input is pulsed. A "Set 9" input terminal 11 is also provided and a pulse applied to this terminal sets the counter to its maximum value irrespective of the count in the counter. A pulse applied to the "count up" input terminal 12 causes the counter to step from its present state to the higher state and in so doing causes the lead which had been "up" in the prior state to go down and causes the next higher lead to go to the "up" state. Thus, if the counter were set so that the "2" output lead of the logical circuits was selected and a pulse appeared at the "count up" input terminal 12 of the counter, the "2" lead would go to the down condition and the "3" lead would come up. A count down input terminal 14 is provided and for each pulse supplied to this terminal the counter steps in the reverse direction.

The flip-flops I, II, III and IV provide the counter storage and are set according to the table in FIG. 2. In the table of FIG. 2, and "S" represents one setting of the flip-flop the "Set" state, and an "R" the other setting the "Reset" state. Thus, for the "0" state of the counter, all flip-flops are set to the same Reset condition. For the "9" setting they are set all to the Set condition and for intermediate digits they are set as shown in the table of FIG. 2. For the particular coding selected in FIG. 2, it will be observed that the flip-flop I alternates between an R and an S setting depending upon the digit. Thus, for all odd digits, the flip-flop I is set to the Set state and for all even digits it is set to the Reset state. This particular coding has an advantage in substantially reducing the complexity of the logical circuits as will hereinafter be explained in detail.

The flip-flops used herein are conventional transistor flip-flops such as are shown in Hunter, Handbook of Semi-Conductor Electronics, McGraw-Hill Book Company, Inc. (1956). Flip-flops suitable for use in our invention are described in this reference at pages 15–38 to 15–43, and will not be described herein in detail. The flip-flops used in our counters preferably have the property that a pulse, to change the state of the flip-flop, may be applied to the output terminal which is normally "up" in that state. Thus, referring to FIG. 1, if flip-flop I is in the Reset state, and it is desired to put it in the Set state, it is necessary only to apply a positive pulse to the lead 16 leading to the Set output terminal of the flip-flop. This causes the flip-flop to change from the Reset to the Set state. The lead 16 which had been negative comes up and becomes positive. This is a conventional feature of known transistor flip-flop circuits.

Another known desirable feature of the flip-flops preferred for use in the counters to be described in that if the flip-flop is in one state and a pulse is applied to both the set terminal 16 and the reset terminal 18 of the flip-flop, the device will also change state. In other words a pulse applied to the currently up state does not inhibit the changing of the flip-flop.

The term flip-flop as previously explained, is used herein and in the claims to include all two valued circuit elements. All such circuit elements may not possess the two specific features described. However, such elements may still be used in the counters of our invention. Flip-flops having these characteristics however substantially reduce the circuit complexity and therefore are preferred for use in counters made according to our invention.

While the flip-flops used in the storage register of our invention may be of any type, we have illustrated our invention with flip-flops in which the output terminal associated with the state to which the flip-flop is set is positive with respect to ground, and when the flip-flop is in the opposite state, this output terminal is negative in potential with respect to ground.

The construction and operation of our improved counters will be described with reference to the embodiment illustrated in FIGS. 3, 4 and 5, it being understood that the particular embodiment is by way of illustration only.

As shown in FIG. 3, the counter includes the flip-flops I, II, III and IV of the type previously described. A conductor is connected to the Set and Reset input terminals of each of these flip-flops, these busses being referred to herein as "horizontal" busses. Thus a conductor connected to the Set input terminal of flip-flop I is illustrated at 16 and to the Reset input terminal at 18. The busses connected to the other flip-flops are correspondingly identified by reference characters 20 through 30. Output busses are provided corresponding to each of the outputs desired. Since one bus is provided for each digit, these busses will be referred to as "digit busses." Thus, if a decimal digital counter is desired, ten digit busses, shown as vertical conductors in FIG. 3, are provided, the bus for the "0" digit being labeled 32, the bus for the "1" digit 34, the "2" bus being 36, "3" bus 38; the "4" bus 40. Since the circuitry associated with the 5, 6, 7 and 8 output busses is identical with that associated with the 2, 3, 4 and 5 digits to be described, the circuitry is not repeated. Accordingly, no busses are shown for these digits but bus 42 is illustrated for the "9" digit. Each of these busses is connected through a resistor to a source of positive voltage 44, bus 32 being connected to the source 44 through resistor 46, bus 34 through resistor 48, bus 36 through resistor 50, bus 38 through resistor 52, bus 40 through resistor 54, and bus 42 through resistor 56. Capacitors 58, 59, 60 and 61 also are connected between digit busses 34, 36, 38 and 40 respectively and the source of positive potential 44. The purpose of these capacitors will be hereinafter explained. We prefer that source 44 be somewhat greater in potential than the positive potential appearing at the output terminals of the flip-flops I, II, III and IV.

As shown in FIG. 3, each of the digit busses 32 through 42 is connected to four of the eight flip-flop busses through four diodes. These connections are made such that for all conditions of the flip-flops, except that condition of the four storage flip-flops corresponding to the digit represented by the digit bus, there will be at least one conduction path from the voltage source 44 through the appropriate connecting resistor and to a flip-flop terminal which is in the negative voltage state. Thus all digit busses except the selected one will be clamped by one or more diodes to this negative voltage. If all the flip-flops are set to the state which corresponds to the digit of the bus, all of the diodes will be connected to flip-flop output terminals which are positive, and the appropriate bus will be clamped at the positive potential of the output terminal.

To illustrate this, it will be observed that bus 32 is connected to the reset inputs of each of the four flip-flops. In the reset condition, the reset terminal of the flip-flop is positive but lower in potential than the source 44. Thus, the bus 32 will be at the positive potential of the flip-flops when all of the flip-flops are in the reset condition. When all of the flip-flops are in the reset condition, then the set terminals associated with each of the flip-flops and therefore the busses 16, 20, 24 and 28, respectively, will be at a negative voltage. Any diode connected from a digit bus to any one of these leads will conduct, thus clamping the voltage of the digit bus to which the diode is connected to this negative value. Bus 34 is connected, for example, by the diode 62 to the bus 16 which in turn is connected to the set input of flip-flop I. Thus, this bus will be held to the "down" potential of the flip-flop when flip-flop I is in the reset condition. Similiarly, bus 36 is connected through diode 64 to horizontal bus 20 which in turn is connected to the set terminal of flip-flop II. Bus 38 is connected through the two diodes 66 and 68 to horizontal busses 16 and 20 and is also held down. The diodes are connected in such a fashion that every bus except the "0" bus is held down when all flip-flops are in the reset condition. Thus, setting the flip-flops in the reset condition uniquely selects the bus 32 associated with "0" digit.

If flip-flop I is changed from the reset to the set condition, then the "0" digit bus 32 will drop in potential because bus 18 connected to the reset terminal of flip-flop I will now become negative and diode 70 connected between bus 32 and the bus 18 will clamp the bus at this negative potential. However, this change in state of flip-flop I causes the diode 62, which had heretofore been holding down bus 34 associated with the "1" digit to now be connected to a source of positive potential, thus clamping bus 34 at a positive voltage. In similar fashion, any one of the ten vertical busses associated with corresponding digits can be selected by a proper setting of the flip-flops I through IV.

As has been explained, when all the flip-flops are in the reset condition, bus 32 is selected and is at the positive potential of the flip-flops. A D.C. amplifier 72 is provided whose input terminal is the bus 32 and whose output terminal is the "0" output lead 73. This amplifier repeats the potential on bus 32 on the output lead 73. Unless otherwise specified, all amplifiers shown in FIG. 3 have substantially unity voltage gain, but provide current amplification. In a preferred embodiment of our invention, the amplifiers shown in FIG. 3 utilize a single transistor connected as an emitter follower. Thus, by placing all the flip-flops in the reset condition and selecting the bus 32, a positive output voltage is provided on the "0" output lead 73.

The operation of our improved counter in response to input pulses can be understood in part by considering the operation that occurs when an input pulse is applied to the set to "0" input terminal 10. As previously explained, the flip-flops are so constructed that a positive pulse applied to an input terminal which is at a negative voltage (because that state is "off" or non-conducting), causes the flip-flop to shift from this state and the potential of the input terminal to the pulse is applied to become positive. To set the counter to provide an output signal corresponding to "0," it is necessary to put all the flip-flops in the reset state. To do this, a positive pulse is applied to the terminal 10. This pulse is passed by the diode 76, amplified by the amplifier 80 and applied to the bus 32. The positive pulse on bus 32 is passed by each of the four diodes connected to the bus to the reset inputs of each of the flip-flops I through IV via the busses 18, 22, 26 and 30. The positive pulse applied to each of the reset inputs has no effect if the flip-flop is already in this condition. However, if a number other than "0" is already stored in the bank of flip-flops, the pulse causes any flip-flop in the set state to change to the reset state. As previously explained, this will pull down all the digit busses 34, 36, 38, 40, 42, etc. to a negative voltage because all of these are connected through a diode to at least one of the "set" busses. However, the bus 32 will assume the potential corresponding to the positive flip-flop output. The positive potential appearing on the bus 32 is amplified by amplifier 72 and provides a "0" output on lead 73. This is the "clearing" step for the register and is usually performed prior to beginning the count.

Having cleared the register, when it is desired to count up from "0," pulses are applied to the count up input terminal 12. Positive pulses appearing at this input are connected through the amplifier 87 to lead 83 and also through the diode 84 to the set bus 16 associated with flip-flop I. It will be observed from FIG. 2, as previously mentioned, that the only difference between any even state and the next higher odd state of the counter is that flip-flop I changes from the reset to the set state. This can be accomplished by supplying a positive pulse on the bus 16, which is what is actually done by the application of the positive count-up pulse through the diode 84 to the bus 16. This positive pulse applied to the bus 16 causes flip-flop I to change state from the reset to the set condition which drops the potential of bus 32 and causes the bus 34 to become positive. An amplifier 86 similar to amplifier 72 is associated with the bus 34 so that when this bus becomes positive, a positive output is provided on the "1" output lead 87. At the same time, the output signal previously appearing on the "0" lead drops to a negative voltage when the diode 70 becomes conducting and bus 32 drops in potential.

When it is desired to count to a still higher value than the "1" which has been set into the register, another positive pulse is applied to the count up input terminal 12. It will be observed from the table of FIG. 2 that it is necessary to change flip-flop I from the set to the reset state and also change flip-flop II from the reset to the set state in order to correctly set the counter to select the bus corresponding to the digit "2," i.e. bus 36. The application of the positive pulse through the diode 84 to the lead 16 will have no effect on the operation of the counter in this condition, since flip-flop I is already in the set state. Rather, it is necessary to provide a pulse input to the bus 36 which will set the flip-flops to their proper states. For this purpose an AND gate 88 is provided. One input of the gate 88 in connected to the output lead from the next lower digit, i.e. from the lead 87 associated with the "1" digit in this case. The gate 88 is opened to receive pulses from the input terminal 12 only when the "1" output lead is positive in potential. When such an output voltage is present, however, pulses at terminal 12 will be amplified by amplifier 82 and applied to the gate 88. After passing through the gate 88 the pulse is again amplified and applied to the bus 36.

The positive pulse applied to the bus 36 sets the bank of flip-flops to their correct operating condition to select the bus 36 from among all the digit busses. Thus, bus 36 will be connected through the various diodes associated therewith to flip-flop terminals which are all positive. Accordingly, the diodes associated with the bus 36 will clamp the bus to the potential of the positive flip-flop output terminals. The positive potential appearing on the bus 36 is amplified by amplifier 92 and appears on "2" output lead 93, all other digit busses being negative in potential because of the flip-flop settings.

The setting of the flip-flops by applying a positive pulse to the bus 36 will result in flip-flop I being put in the reset condition. In the reset condition, bus 34 associated with the digit "1" will be clamped through the diode 62 to a negative value and accordingly the potential on bus 34 will fall to a negative value thus causing the "1" output lead 87 to go negative. It will be observed that the positive count-up pulse applied to bus 36 will be applied through diode 102 to the reset terminal of flip-flop I via bus 18. At the same time, this same input pulse is being applied through the diode 84 and horizontal bus 16 to the set terminal of this same flip-flop. It is desired that flip-flop I change state from the set to the reset condition to select bus 36. Because of the property previously mentioned that a state changing signal applied to both input terminals of the flip-flop simultaneously will cause it to change state, no particular circuitry is required to insure a change of state of the flip-flop for this condition. However, if the flip-flops did not have this property, it is obvious that an AND gate could be inserted between diode 84 and horizontal bus 16, the gate to be closed only when an "even" output signal i.e. "0," "2," "4" etc. is present to obviate the problem of simultaneous application of the pulses to both inputs.

The function of the capacitor 58 can also be understood when it is realized that positive pulses are applied for a finite time to both horizontal busses 16 and 18. If the capacitor were not present, the application of a positive pulse to both busses 16 and 18 would result in the action just described. However, bus 34 would drop immediately from the potential of source 44 to a negative potential, thus closing the gate 88 and removing the positive pulse from bus 36. The counter is now in the state corresponding to a count of "2." However, if the input pulse is still present on the lead 16, flip-flop I may then change state again to the "3" state which would, of course, result in an erroneous count.

This situation may be prevented by holding gate 88 open until the input pulse has terminated. To insure that gate 88 remains open, capacitor 58 is connected between bus 34 and source 44, thus delaying its drop in potential when flip-flop I changes state for a time sufficient for the input pulse to terminate.

To count from 2 to 3, it will be apparent that it is only necessary to complement the flip-flop I and accordingly the next positive pulse appearing at the count up terminal 12 will be applied through the diode 84 to the bus 16 and via the bus 16 to the set terminal of flip-flop I. This will cause the flip-flop to change from the reset to the set condition which is the condition necessary to select the bus 38 from among all the digit busses. No gates or similar circuitry are required between the cir cuitry associated with bus 36 and that associated with bus 38. The convenience of merely complementing flip-flop I to count up from any even to any odd state comes about, of course, as the result of the code selected for representation of the decimal digits as illustrated in FIG. 2. It is apparent that by selecting a code in which the change from any even state to the adjacent odd state require only a change in state of one flip-flop, we have substantially diminished the amount and complexity of the logical circuits required. Gating and amplifying circuits need be provided for count up operation only between each odd state and the next succeeding even state. For count down operation gating and amplifying circuitry are needed only for counting for any odd state to the next lower even state.

It is to be understood however that gating and amplifying circuits similar to gate 88 and amplifier 89 may be provided between each of the states if desired. If this circuitry is provided, then diode 84 may be omitted as well as the capacitors corresponding to capacitor 58. If this additional logical circuitry is provided, the code selected for representation of the counter digits by the bank of flip-flops may be completely arbitrary, and there is no requirement that flip-flop I alternate between the reset and the set state as the digit represented changes from even to odd but it may assume any convenient value.

To count from 3 to 4 it is necessary to change the state of flip-flop I and flip-flop III. Accordingly, a pulse must be supplied on the bus 40. However, this pulse can be supplied only when the counter is in the "3" state and a count up pulse is present on lead 83. An AND gate 96 is provided which performs a function similar to the AND gate 88. An amplifier 97 is also provided and in general the circuitry between the "3" state and the "4" state of the computer is identical to that between the "1" and the "2" state and operates in the same fashion.

Additional circuitry identical to that illustrated is provided between the digit pairs 5—6 and 7—8. However, this circuitry is not illustrated in FIG. 3 since it is identical with that already shown and described and functions in the same manner.

In summary, then, the even numbers, 0, 2, 4, etc. are set into the counter by applying a positive pulse to the appropriate digit bus in the diode matrix. Odd numbers are set by complementing the flip-flop I from the preceding even number by supplying a pulse to its "set" input terminal. This has the effect of adding a single digit to the number already stored in the register. For count up operation pulses are fed to the busses associated with the even numbered digits through AND gates, the AND gates being opened by the presence of an output signal corresponding to the next lower odd digit.

It will be observed in FIG. 3 that the final output lead corresponds to the digit "9"; this lead is selected when the flip-flops I, II, III and IV are all in the set state. To count from 8 to 9 it is necessary only to apply a positive pulse to the set input of flip-flop I when the counter is in the "8" state which changes this flip-flop from the reset to the set condition. The amplifier 98 associated with the "9" output lead 99 is identical with the amplifiers 72, 86 and 92 heretofore described and the circuit is otherwise the same.

To provide apparatus for setting the counter to its maximum value, we provide "set to 9" input terminal 11. Pulses applied to this terminal are amplified by amplifier 100 and are fed from there to the bus 42. When a positive pulse is applied to the "set to 9" terminal 11 it is amplified by the amplifier 100 and applied to the bus 42. This positive pulse is passed by each of the diodes associated with the bus 42 to the horizontal busses 16, 20, 24 and 28 connected to the set inputs of the flip-flops. Thus the positive pulse applied to the input terminal sets all the flip-flops to the set condition regardless of their previous state, and selects bus 42 from among all the digit busses, thereby providing a positive output signal on the lead 99.

As so far described, the counter of FIG. 3 may be cleared by applying a pulse to the set to 0 input terminal 10 may be stepped upwardly from "0" or indeed from any value other than its maximum value by applying pulses to the count up input terminal 12, and may be set to its maximum value by applying an input pulse to the "set to 9" terminal 11. Additionally, counters made according to our invention may be designed to count downwardly as well as upwardly, i.e. if the counter contains, for example, a 7, by applying pulses to a count down input, the counter may be made to step to 6, to 5, to 4, etc. as may be appropriate. Thus, if it is desired to know the difference between the number of pulses on two leads, these pulses may be fed on one lead to the count up input terminal of the counter and from the other lead to the count down input terminal. The difference will appear as counter output.

Because of the code selection, in counting down from any uneven digit, i.e. 1, 3, 5, 7, 9 to any even digit, it is only necessary to apply a reset pulse to the I flip-flop. Thus, the count down input terminal 14 is connected via diode 101 in FIG. 3 to the reset terminal of flip-flop I. By applying a positive pulse to the count down terminal 14 when the counter is set for any odd digit (in which case flip-flop I is in the "set" state) the positive pulse passed by the diode 101 to the bus 18 will cause flip-flop I to change from the set to the reset condition and the next lower even bus will therefore be selected. For example, if the counter is set for the digit 3 in which case flip-flops I, and II are in the set state and III and IV are in the reset state and a positive pulse is applied to the terminal 14, this will reset flip-flop I. Diode 66 will then clamp the potential of digit bus 38 to the negative potential of the flip-flop outputs. At the same time, diode 102 which was clamping from the bus 36 to a negative value in the "3" state because connected to the reset bus 18 associated with flip-flop I, will now clamp bus 36 to the positive potential of the flip-flop output as the result of the application of the positive pulse to the bus 18 and the change in state of the flip-flop. Accordingly, digit bus 36 rises to the positive flip-flop voltage providing a positive output on lead 93. Thus, substantially half of the necessary circuitry for count down operation is provided merely by connecting the diode 101 between the terminal 14 and the bus 18.

When it is desired to decrease the count of the register from an even to the next odd digit, an examination of the table of FIG. 2 indicates that at least two, and in some cases three of the flip-flops must be caused to change state. Accordingly, the pulse is fed through the amplifier 104 to the count down pulse bus 106 and from there to the gates 108 and 110. These gates perform functions similar to the gates 88 and 96 for counting in the upward direction; however these gates are enabled only when the counter is in the state corresponding to one of the even digits. Thus, gate 108 is open only when the counter is providing a positive output on the "4" output lead, and gate 110 is open only when the counter is providing an output on the "2" output lead. The step down pulses may be applied to these gates and the output of the gates applied directly to the bus corresponding to the next lower odd digit.

For example, assume that the counter was in the state providing an output on the "4" output lead. If a count down pulse is received it will be passed by the gate 108, amplified by the amplifier 112, and applied directly to the bus 38. As previously explained, a pulse applied to this bus will set the bank of flip-flops to the proper states to select the digit bus 38 and provide an output on the "3" output lead. The gate 110 and amplifier 114 associated therewith function in the same manner. It will be noted that capacitors 59 and 61 are provided between the source 44 and the even digit busses for the same reason that capacitors 58 and 60 were provided for the odd busses, as previously explained. Although the circuitry for counting down between the digits 8 and 7 and 6 and 5 is not illustrated, it will be understood that it is identical to that shown between the digits 4—3 and 2—1.

It will thus be seen that by locating the logical circuit elements on the output side of the diode matrix which selects one out of a plurality of output leads in the logical circuits needed to provide both count-up and count-down of the counter are achieved. Additionally, all counter circuit elements herein described may be synthesized from electronic components and accordingly the counter may be made extremely high speed in operation.

In FIG. 4 we have illustrated an actual schematic circuit of a high speed electronic counter made according to our invention. In this circuit, we have illustrated a counter only for count up operation, it being understood that count down circuits would be substantially identical. A typical portion of the circuits associated with a reversible counter are shown in FIG. 5. To further simplify FIG. 4, we have illustrated the circuitry between the "1" digit bus 34 and the "2" digit bus 36, enclosed within the dotted lines as shown. The circuits enclosed within the solid lines between the "3" digit bus and the "4" digit bus, between the "5" digit bus and the "6" digit bus, and between the "7" digit bus and the "8" digit bus are identical to that shown between the "1" digit bus and the "2" digit bus and accordingly are not specifically illustrated.

As shown in FIG. 4, the positive input pulse to set the counter illustrated therein to "0" is applied through the diode 76 to the base of a transistor 116 which forms the amplifier identified as 80 in FIG. 3. This transistor is an npn type whose base is returned to a source of negative voltage 117 through the resistor 118. The collector of the transistor is connected to a source of positive voltage, as for example the source 44 of FIG. 3. The emitter of transistor 116 is connected directly to the "0" digit bus 32 of the matrix, the bus 32 also being connected to source 44 through the resistor 46. If the counter is set for other than a "0" output, one of the diodes connected between the bus 32 and the busses 18, 22, 26 or 30 will clamp the conductor to the negative flip-flop output voltage. The amplifier identified as the amplifier 72 in FIG. 3 is seen to be a pnp transistor 120 whose base is connected directly to the bus 32 as seen in FIG. 4. The collector of the transistor is returned to a source of negative potential 122 the absolute magnitude of which is preferably smaller than the source 117. The emitter of the transistor 120 is connected to source 44 through a relatively large resistor 123 and the junction of the emitter and the resistor is the "0" output lead. Thus transistor 120 is connected as an emitter follower to provide a current amplification of the signal appearing on its base, and to repeat the voltage applied thereto.

When one of the diodes associated with the "0" bus 32 is conducting, and the base of the transistor 120 is at a substantial negative potential, there is a substantial current flow through the transistor 120. This substantial current flow from the source 44 drops the potential at the junction of the emitter of transistor 120 and the resistor 123 to the negative low value of the bus 32, the emitter-base diode acting as a clamp. However, when all the diodes associated with "0" digit bus 32 in the matrix are at the positive flip-flop potential because all the flip-flops are in the reset state, the potential on the bus will raise this potential. Because the positive flip-flop voltage is less than the source 44, the emitter-base diode of transistor 120 will function as a clamp to hold the voltage at the junction of the emitter of transistor 120 and the resistor 123 to a value essentially that of the positive flip-flop potential. In this manner, the transistor 120 and the resistor 123 function as a current amplifier to provide a positive output on the "0" output lead when the bus 32 is at the potential of the positive flip-flop voltage and to provide a negative output when any one of the diodes associated with the digit bus 32 is conducting. It will be observed in FIG. 4 that digital bus 34 is connected to the base of a transistor 124 which together with resistor 126 forms the amplifier 86 of FIG. 3. Transistor 124 and resistor 126 are connected in the same manner as is transistor 120 and resistor 122 and perform the same function.

A diode 127 is connected between the "1" output lead and the resistor 128, the resistor 128 in turn being connected to a source of positive voltage 130. Source 130 has a larger value than the source 44. Diode 127 is one of two diodes performing the function of the gate 88 shown in the block diagram of FIG. 3. Thus, when transistor 124 is conducting heavily because lead 34 is "down" the potential at the emitter of transistor 124 is relatively low and a substantial current flows through resistor 128, diode 127 and the transistor. However, when the junction of the emitter of transistor 124 and resistor 126 goes positive to provide a positive output indication, diode 127 is cut off and current no longer flows through this diode. However, current may still flow through resistor 128 and diode 130 via the count up pulse bus 83 through the transistor 132 which in the absence of a step input pulse is conducting. The current flow through transistor 132 results from the fact that in the absence of an input pulse, the count up input terminal is connected externally to a negative quiescent voltage (not shown). However, with the counter in the "1" condition, and a count up input pulse applied to the base of transistor 132, the transistor 132 is cut off during the period of the pulse and the voltage at the emitter thereof rises to the potential of source 44. The positive voltage appearing at the emitter of transistor 132 causes conduction through diode 130 to cease because of the application of this voltage via the count up pulse bus 83. When both diode 127 and 130 are cut off, the bias on the base of transistor 132 rises sufficiently, as determined by the resistors 136 and 138 to cause transistor 134, which is normally cut off, to conduct. The period of conduction by transistor 134 lasts only so long as the positive step impulse is applied to the emitter follower 126.

The positive pulse supplied by transistor 134 to digital lead 36 sets the register flip-flops for a "2" output, the pulse being applied to flip-flop II through diode 64 to cause it to change to the "set" state and through the diode 102 to flip-flop I to cause it to change from the "set" to the "reset" state. Thus, the application of a pulse at the count up input terminal 12 when the counter was in the "1" state has caused the counter to move to the "2" state. Transistor 134 performs essentially the function indicated by the amplifier 82 in the block diagram, FIG. 3.

A transistor 140 is provided whose base is connected to lead 36, transistor 140 and resistor 142 forming the amplifier indicated schematically at 92 in FIG. 3. The operation of transistor 140 and resistor 142 to perform this amplifying function is identical with that described in connection with transistor 120 and resistor 123. The final stage associated with the "9" state of the counter of FIG. 4 is substantially identical with that of the "0" stage, the pnp transistor 144 and resistor 146 performing the amplifying function indicated by the amplifier 98 in FIG. 3. Additionally, a transistor 148 is provided to amplify the set to 9 input pulse applied to terminal 11 before supplying it to the bus 42. The particular schematic circuits which have been illustrated in connection with the diagram of FIG. 4 have been simplified to show only a "count up" circuit, the gating circuits required for "count down" operation being omitted.

The circuit between the digit busses "1" and "2" and those enclosed within the boxes between the digits 3—4, 5—6 and 7—8 when both count up and count down operation is provided may be as shown in FIG. 5.

The circuit of FIG. 5 is substantially identical with that shown in FIG. 4. However, a transistor 148 whose function is the same as transistor 134 has been added thereto, the emitter of this transistor being connected to the digit bus 34. The base of transistor 148 is returned to a voltage divider circuit connected between source 130 and source 116. Resistor 150 of this voltage divider corresponds to resistor 128, the two lower resistors 152 and 154 correspond respectively to the two resistors 136 and 138 associated with transistor 134. The junction of resistors 152 and 150 is connected through diodes 156 and 158 which together form the gate 110 of FIG. 3 to the "2" output lead and to the source of count down pulses respectively. Thus, diode 156 performs the same enabling function for count down pulses as diode 127 performs for count up pulses, i.e. when the "2" output is "up" or positive count down pulses appearing on lead 106 will cut off diode 158 and cause the bias on the base of transistor 148 to rise sufficiently to apply a positive pulse to the digital lead 34 of the diode matrix. This will set the diode matrix as has been previously explained. An emitter follower using transistor 160 similar to the emitter follower using transistor 126 is provided to amplify the count down pulses, applied to count down input terminal 14.

Counters made according to our invention may be used for example as counters in the storage register of a digital to analog converter. The particular counter disclosed in FIG. 4 hereof is preferred by us for use in the novel analog to digital converter disclosed in our copending application entitled "Improved Analog to Digital Converter" filed August 6, 1959, Serial No. 832,039. The static shift register forming a part of the analog to digital converter disclosed in the above-identified copending application may also be a counter made according to our invention as herein described, if so desired.

Thus, we have provided a substantially improved design for an electronic counter using a bank of flip-flops as storage elements. In general, counters made according to our invention include a bank of flip-flops, with a diode matrix capable of selecting one of a plurality of conductors depending upon the setting of the flip-flops. Logical circuits are arranged on the output side of this diode matrix in connection with the selected conductors of the matrix to provide for counting. By selecting a code representation for the digit to be counted in which one of the flip-flops alternates between one state and the other as the counter moves from one count to the next adjacent count, we achieve a substantial simplification in the logical circuits, reducing the complexity by almost one half. Further, because of the extreme simplicity of the logical circuits, a forward-backward counter i.e. one which will count in either direction can readily be provided, and we have disclosed both the logical arrangement for such a counter and the specific circuitry which might be used for a counter of this type. It will be observed, that since the logical circuits perform their functions without reference to the code which is utilized to represent the digit stored in the counter by the flip-flops, the binary to output coding may be readily changed merely by changing diodes in the matrix. This provides extreme flexibility for counters of this type and the code which is optimum for the particular application may be selected. Since the storage flip-flops for any state are set by the application of a positive pulse to the appropriate vertical lead in the matrix, no restriction on counter speed is imposed by the selected code, and all codes are equally fast. As mentioned previously, this results because all the flip-flops for a particular count are set simultaneously, in contrast to prior counters where the setting of one caused the next one to be set etc. This "fast carry" feature of our counter together with the electronic implementation of our invention as described provides an extremely high speed counter of wide application.

It will thus be seen that the objects set forth above among those made apparent from the preceding description, are efficiently obtained and, since certain changes may be made in the above construction without departing from the scope of our invention, it is intended that all matter contained in the above description or shown in the accompanying drawings shall be interpreted as illustrative and not in a limiting sense.

It is also to be understood that the following claims are intended to cover all of the generic and specific features of our invention herein described, and all statements of the scope of the invention which, as a matter of language, might be said to fall therebetween.

Having described our invention what we claim as new and desirable to secure by Letters Patent is:

1. An electronic pulse counter comprising, in combination, a storage register, said register including a plurality of flip-flops, each of said flip-flops having a pair of terminals associated with it, the control signal for setting said flip-flop being applied to said terminals and the output signal from said flip-flop appearing at said terminals; a matrix, said matrix including a first set of electrical conductors, each of said first conductors being connected to one of said terminals of said flip-flops in said storage register, a second set of electrical conductors, a plurality of diodes selectively interconnecting said first and second sets of conductors in accordance with a predetermined code, whereby an electrical potential appears on a selected one of said second sets of conductors different than that appearing on all the other conductors of said second set, depending upon the state of the flip-flops in said register; a pulse input terminal for connection to a source of electrical pulses to be counted, a plurality of normally closed AND gate circuits, each of said AND circuits having a pair of input and a single output terminal, means connecting said pulse input terminal to a first input terminal of each of said AND gate circuits, means connecting selected ones of said second set of conductors to the second input terminal of selected ones of said AND gates, and means connecting the output terminals of said AND gates to that conductor of said second set which is to be selected next following the conductor to which said second input terminal of said AND gate is connected, whereby a pulse supplied to said input terminal causes one of said second set of conductors to be energized thereby setting said flip-flops in said storage register and causing said energized conductor to remain selected, until another pulse is applied to said pulse input terminal.

2. The combination defined in claim 1 in which said AND gates are included between every other pair of said second set of conductors in said predetermined sequence in which said second set of conductors is energized.

3. The combination defined in claim 1 in which at least two pulses input terminals are provided, a sequence of pulses applied to a first of said terminals causing energization of said second set of conductors in said predetermined order, a different conductor being energized for each pulse applied to said first input terminal, and a sequence of pulses applied to said second pulse input terminal causing energization of said second set of conductors in inverse order from said predetermined order.

4. An electronic pulse counter comprising, in combination, a storage register including a plurality of flip-flops, each of said flip-flops having a pair of terminals associated with it, the control signal for setting said flip-flop being applied to said terminals and the output signal from said flip-flop appearing at said terminals; a matrix, said matrix including a first set of conductors connected to the terminals of said flip-flops, a second set of conductors, and diodes selectively interconnecting said first and said second set of conductors such that one of said second set of conductors is uniquely selected from among said second set of conductors depending upon the state of said flip-flops, logical circuits associated with said second set of conductors, said logical circuits having a pulse input terminal, a sequence of pulses applied to said pulse input terminal causing energization of each of said second set of conductors in a predetermined sequence, a different conductor being energized for each pulse appearing at said input terminal, energization of each of said conductors causing said flip-flops in said storage register to assume a unique combination of states, and a change in state of only one of said flip-flops from a first to a second state occurring during alternate steps in said predetermined sequence, said logical circuits including means connecting said pulse input terminal to the control terminal of said flip-flops whose state alternates as said sequence progresses for setting said flip-flop to said second state, means connecting said pulse input terminal in parallel to one input terminal of a plurality of AND gates, means connecting another input terminal of said AND gates to conductors in said second set of conductors which are selected when said flip-flop whose state alternates as said sequence progresses is in said second state, and means connecting the output terminals of said AND gates respectively to the conductor in said second set of conductors to be energized next following the conductor to which the input terminal of said AND gates are connected when said conductors are energized in said sequence.

5. The combination defined in claim 4 which includes means for delaying the de-energization of those conductors in said second set of conductors which are connected to one input terminal of said AND gates when the next conductor in said sequence is energized.

6. The combination defined in claim 4 in which said logical circuits have a second pulse input terminal, a sequence of pulses applied to said second pulse input terminal causing energization of each of said second set of conductors in the reverse order from said sequence, and in which said logical circuits include means connecting said second pulse input terminal to the control terminal of said flip-flop whose state alternates as said sequence progresses for setting said flip-flop to said first state, a second set of AND gates and means connecting said pulse input terminal in parallel to one input terminal of each of said second set of AND gates, means connecting another input terminal of said second set of AND gates respectively to those conductors in said second set which are selected when said flip-flop whose state alternates as said sequence progresses is in said first state, and means connecting the output terminals of said second set of AND gates to the next conductor in said second set of conductors to be energized next following the conductor to which the input terminal of said AND gate is connected when said conductors are energized in said reverse sequence.

7. The combination defined in claim 6 which includes means for delaying the de-energization of those conductors in said second set of conductors which are connected to one input terminal of said AND gates in both said first and second sets of gates.

8. An electronic pulse counter comprising, in combination, a storage register including at least four flip-flops, each of said flip-flops having a "set" and a "reset" state and a "set" and a "reset" terminal, a pulse of a first polarity applied to either of said terminals causing the flip-flop to assume the state corresponding to said terminal, said flip-flop terminals also being the output terminals thereof, a matrix, said matrix including a first set of conductors connected to the terminals of said flip-flops, a second set of conductors selectively to provide voltages representing decimal digits, a voltage source of said first polarity each of said conductors in said second set being connected to said voltage source by a separate resistor, diodes interconnecting said conductors of said first and second sets such that one conductor of said second set is at a potential of the polarity of said voltage source and all other conductors are at a potential of opposite polarity to said voltage source depending upon the state of said flip-flops, and logical circuits for selectively energizing said second set of conductors, said logical circuits including a pulse input terminal, a sequence of pulses applied to said pulse input terminal causing said counter to change the polarity of the voltage of each of said second set of conductors to the polarity of said voltage source in a predetermined sequence, an input pulse of said first polarity applied to any one of said second set of conductors being applied by said diodes to said flip-flops to cause said flip-flops to assume the state associated with said conductor, thereby selecting said conductor, said matrix being arranged such that one of said flip-flops alternates its state between adjacent counts, said logical circuits including means connecting said pulse input terminal to the bus connected to one terminal of said flip-flop which alternates its state to cause said flip-flop to change the count in said counter from even to odd, a plurality of AND gates, means connecting said pulse input terminal to one input terminal of each of said AND gates, means connecting the other input terminal of each of said AND gates to an "odd" digit bus, whereby each of said AND gates is opened when said "odd" digit bus is selected, and, means connecting the output terminal of said AND gate to the next bus to be energized when said busses are energized in said sequence.

9. The combination defined in claim 8 which includes a second pulse input terminal, a sequence of pulses applied to said second pulse input terminal causing said counter to count in a direction which is the reverse of the direction that said counter counts when pulses are applied to said first pulse input, means connecting said second pulse input terminal to the other terminal of said flip-flop which alternates in state as said sequence progresses, a second set of AND gates, means connecting said second pulse input terminal to one input terminal of each of said second set of AND gates, means connecting the other input terminal of each of said AND gates to alternate "even" digit busses in said second set of busses, and means connecting the output of each of said AND gates to the next "odd" bus to be selected when said busses are to be selected in said reverse direction.

10. The combination defined in claim 8 which includes means for clearing said register, said clearing means comprising a pulse input terminal, and means connecting said pulse input terminal to that bus of said second set of busses which corresponds to the lowest value of said counter.

References Cited in the file of this patent
UNITED STATES PATENTS

| | | |
|---|---|---|
| 2,816,223 | Nelson | Dec. 10, 1957 |
| 2,845,617 | Turvey | July 29, 1958 |